(12) United States Patent
Luz Minguez et al.

(10) Patent No.: US 12,383,883 B2
(45) Date of Patent: Aug. 12, 2025

(54) METHOD OF MAKING COLLOIDAL SUSPENSIONS OF METAL ORGANIC FRAMEWORKS IN POLYMERIC SOLUTIONS AND USES THEREOF

(71) Applicant: Research Triangle Institute, Research Triangle Park, NC (US)

(72) Inventors: Ignacio Luz Minguez, Durham, NC (US); Mustapha Soukri, Cary, NC (US); Marty Lail, Raleigh, NC (US); Lora Goon Toy, Morrisville, NC (US)

(73) Assignee: RESEARCH TRIANGLE INSTITUTE, Research Triangle Park, NC (US)

( * ) Notice: Subject to any disclaimer, the term of this patent is extended or adjusted under 35 U.S.C. 154(b) by 0 days.

(21) Appl. No.: 18/632,596

(22) Filed: Apr. 11, 2024

(65) Prior Publication Data
US 2024/0342683 A1      Oct. 17, 2024

Related U.S. Application Data

(62) Division of application No. 17/054,590, filed as application No. PCT/US2019/032766 on May 17, 2019, now Pat. No. 12,109,549.

(60) Provisional application No. 62/673,389, filed on May 18, 2018.

(51) Int. Cl.
| | | |
|---|---|---|
| *B01J 20/22* | (2006.01) | |
| *B01D 53/02* | (2006.01) | |
| *B01D 53/22* | (2006.01) | |
| *B01J 20/28* | (2006.01) | |

(52) U.S. Cl.
CPC ............ *B01J 20/226* (2013.01); *B01D 53/02* (2013.01); *B01D 53/228* (2013.01); *B01J 20/28026* (2013.01); *B01J 20/28033* (2013.01); *B01J 20/28059* (2013.01); *B01J 20/28061* (2013.01); *B01J 20/28064* (2013.01); *B01J 20/28066* (2013.01); *B01J 20/28083* (2013.01); *B01D 2253/204* (2013.01)

(58) Field of Classification Search
CPC ...................................................... B01J 37/04
See application file for complete search history.

(56) References Cited

U.S. PATENT DOCUMENTS

| 3,167,252 | A | 1/1965 | Smith |
| 3,167,525 | A | 1/1965 | Thomas |
| 8,562,856 | B2 | 10/2013 | Giannantonio et al. |
| 2009/0126570 | A1* | 5/2009 | Liu ............... B01D 71/0281 96/4 |
| 2011/0144365 | A1 | 6/2011 | Park et al. |
| 2012/0152845 | A1 | 6/2012 | Levan et al. |
| 2015/0367294 | A1 | 12/2015 | Kharul et al. |
| 2016/0263533 | A1 | 9/2016 | Odeh et al. |
| 2017/0028390 | A1 | 2/2017 | Reynolds et al. |

FOREIGN PATENT DOCUMENTS

| CN | 105435652 | A | 3/2016 |
| CN | 104001426 | B | 4/2016 |
| EP | 2341031 | A1 | 7/2011 |
| JP | 2017501862 | A | 1/2017 |
| KR | 20080036014 | A | 4/2008 |
| WO | 2018031733 | A1 | 2/2018 |
| WO | 2018084264 | A1 | 5/2018 |

OTHER PUBLICATIONS

ISA/US; International Search Report and Written Opinion for International Patent Application No. PCT/US2019/032766 dated Sep. 17, 2019, 13 pages.
Rodenas, Tania, et al., "Metal-organic framework nanosheets in polymer composite materials for gas separation", Nature Materials: Letters, Nov. 2014, 8 pages.
Ghalei, Behnam, et al., "Enhanced selectivity in mixed matrix membranes for CO2 capture through efficient dispersion of amine-functionalized MOF nanoparticles", nature engery, vol. 2, Article No. 17086, Jun. 2017, 9 pages.
Semino, R., et al., "Understanding the Origins of Metal-Organic Framework/Polymer Compatibility", Royal Society of Chemistry: Chemical Science, 2017, 12 pages.
Bachman, Jonathan E., et al., "Plasticization-resistant Ni 2 (dobdc)/polyimide composite membranes for the removal of CO 2 from natural gas", Royal Society of Chemistry: Energy & Environmental Science, 2016, 8 pages.
Dechnik, Janina, et al., "Mixed-Matrix Membranes", Angewandte Chemie International Edition, 2017, vol. 56, 19 pages.
Luz, Ignacio, et al., "Confining Metal—Organic Framework Nanocrystals within Mesoporous Materials: A General Approach via "Solid-State" Synthesis", Chemistry of Materials, ACS Publications, 2017, vol. 29, No. 22, 11 pages.
Denny, Jr., Michael S., et al., "Metal-organic frameworks for membrane-based separaions", Nature Reviews: Materials, Article No. 16078, 2016, 17 pages.
Wu, Dingcai, et al., "Design and Preparation of Porous Polymers", Chemical Reviews, ACS Publications, 2012, vol. 112, 57 pages.
EPO; Extended European Search Report for European Patent Application No. 19803812.7 dated Jan. 27, 2022, 9 pages.
Liu, Yunyang, et al., "Sythesis of continuous MOF-5 membranes on porous α-alumina substrates" Microporous and Mesoporous Materials, vol. 118, 2009, 6 pages.
JPO; Notification of Refusal for Japanese Patent Application No. 2020-562173 dated Jan. 31, 2023, 7 pages.

(Continued)

*Primary Examiner* — Thuan D Dang
(74) *Attorney, Agent, or Firm* — NK Patent Law

(57) ABSTRACT

A suspension comprises a nano-crystalline metal organic framework suspended in a polymeric solution. The nano-crystalline metal organic framework comprises micropores having an average diameter in the range of 0.5-5 nm, and the nano-crystalline metal organic framework is substantially homogenously dispersed in the polymeric solution, which comprises a first polymeric material dissolved in a non-aqueous solvent.

8 Claims, 12 Drawing Sheets

(56) References Cited

OTHER PUBLICATIONS

IPI; Examination Report for Indian Patent Application No. 202017047594 dated Apr. 19, 2022, 5 pages.
Chinese Patent Office; Rejection Decision from corresponding CN Patent Application No. 2019800318956, mailed Sep. 29, 2023, 15 pages.
Brazilian PTO; Written Opinion for Brazilian Patent Application No. 11 2020 023472-9 dated *, 12 pages.
United Arab Emirates Ministry of Economy; Search Report for Brazilian Patent Application No. P6001529/2020 dated May 25, 2023, 8 pages.
Australian PTO; Office Action for Australian Patent Application No. 2019270164 dated Jan. 22, 2024, 2 pages.
Korean PTO; Office Action for Korean Patent Application No. 10-2020-7036350 dated Mar. 30, 2024, 6 pages.

* cited by examiner

Fig. 7a
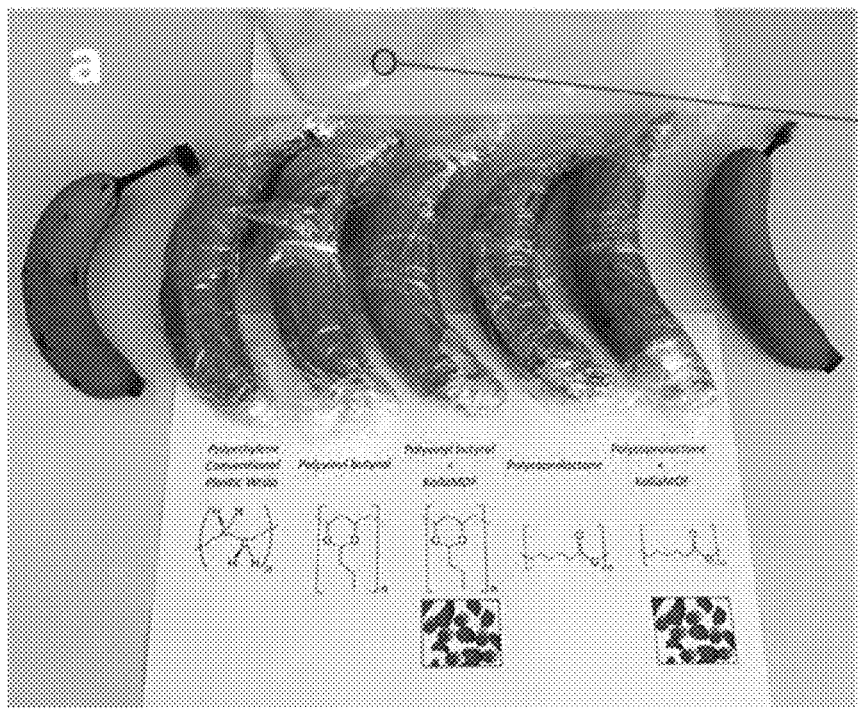
Fig. 7b
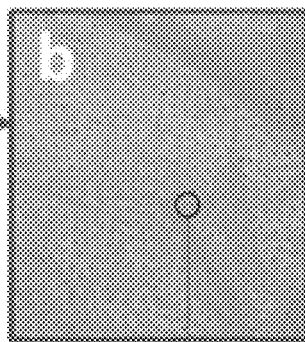
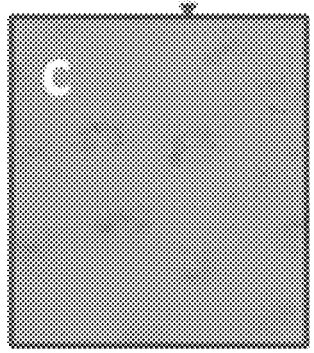
Fig. 7c

METHOD OF MAKING COLLOIDAL SUSPENSIONS OF METAL ORGANIC FRAMEWORKS IN POLYMERIC SOLUTIONS AND USES THEREOF

CROSS-REFERENCE TO RELATED APPLICATIONS

This application is a divisional application of U.S. patent application Ser. No. 17/054,590, filed Nov. 11, 2020, which was a U.S. National Stage Application of International Patent Application No. PCT/US19/32766, filed May 17, 2019, which claimed the benefit of priority of U.S. provisional patent application No. 62/673,389, filed May 18, 2018, which are incorporated herein by this reference.

STATEMENT REGARDING FEDERALLY SPONSORED RESEARCH OR DEVELOPMENT

This invention was made with government support under DE-FE0026432 awarded by US Department of Energy. The government has certain rights in the invention.

FIELD

The present disclosure describes colloidal suspensions of nano-crystalline metal organic frameworks in polymeric solutions and methods of making and using the same. The nano-crystalline metal organic framework will generally be formed using a method of solid-state crystallization, wherein the metal organic frameworks (MOFs) are formed within the pore spaces of mesoporous polymeric materials (MPMs) in the absence of solvent.

BACKGROUND

Hybrid materials based on metal organic frameworks (MOFs) as functional species blended with different supports (such as metals, metal oxides, carbon, and polymers) have been used to integrate beneficial features of the MOFs (such as elevated surface areas, well-defined active sites, highly designed functionality, etc.) while reducing the impact of properties that may have been weaknesses as single components (such as handling, mechanical/thermal/chemical resistance, conductivity, etc.) and further adding synergistic properties that arise from the intimate interactions and complex hierarchical architectures of the resulting hybrid composite materials (such as micro/meso-porosity, multi-functionality, etc.). Hybrid materials in which MOFs are embedded into a continuous matrix have been used for various applications such as gas adsorption/separation, drug delivery, proton conductivity, sensors, optoelectronics, and heterogeneous catalysis.

A general method for selective confinement of MOF nanocrystals within mesoporous materials (MPMs) via 'solid-state' synthesis was described in commonly-owned PCT Patent Application Publication WO 2018/031733. The solid state synthesis method provides a high level of design over the resulting hybrid material formulation and nano-architecture, such as composition, loading and dispersion of the MOF guest as well as composition, pore size distribution and particle size of the mesoporous material host. MOF crystalline domains are restricted to the dimensions delimited by the hosting cavity of the mesoporous material. In addition, WO 2018/031733 describes $CO_2$ capture capacity as fluidized hybrid sorbents for post-combustion flue gas of the hybrid MOF/MPM materials compared to the 'state-of-the-art'. WO 2018/031733 describes the use of solid hybrid materials wherein MOF nanocrystals are embedded in a mesoporous support material. Some applications for the hybrid materials require that the materials be in a liquid state to be engineered into the final product. Examples of this type of application include membranes, coatings, films, textiles, food packaging, gas/liquid chromatography, personal protection, ink for 3D printing, electronics, photoluminescents, and drug delivery. Advantageously, liquid form hybrid materials can be directly applied to conventional technologies (e.g., polymer technology) at an industrial scale.

SUMMARY OF THE DISCLOSURE

In accordance with a first aspect of the invention, a suspension comprises a nano-crystalline metal organic framework suspended in a polymeric solution. The nano-crystalline metal organic framework comprises micropores having an average diameter in the range of 0.5-5 nm. The nano-crystalline metal organic framework is substantially homogenously dispersed in the polymeric solution, which comprises a first polymeric material dissolved in a non-aqueous solvent.

In accordance with a second aspect of the invention, a method for making a metal organic framework suspension comprises providing a hybrid material comprising a nano-crystalline metal organic framework comprising micropores and a mesoporous polymeric material comprising mesopores, wherein the nano-crystalline metal organic framework is homogeneously dispersed and substantially present only within the mesopores or void spaces of the mesoporous polymeric material; and wherein the hybrid material has a weight percentage of the metal organic framework in the range of 5-50% relative to the total weight of the hybrid material and contacting the hybrid material with a solvent in which the mesoporous polymeric material is soluble, thereby forming a polymeric solution in which the nano-crystalline metal organic framework is substantially homogeneously dispersed and suspended.

In accordance with a third aspect of the invention, a polymeric membrane comprises a nano-crystalline metal organic framework comprising micropores. The micropores have an average diameter in the range of 0.5-5 nm. The membrane further comprises a polymeric matrix comprising a first polymeric material and a second polymeric material. The nano-crystalline metal organic framework is substantially homogenously dispersed throughout the matrix.

BRIEF DESCRIPTION OF THE FIGURES

FIG. 2a) as-synthetized solid pellets (SEM), FIG. 2b) purified solid pellets (SEM), and FIG. 2c) suspended liquid (Co)MOF-74 (TEM).

FIG. 7a is a photograph showing a comparison of thin films comprising (Co)MOF/TENAX and thin films not comprising (Co)MOF/TENAX.

FIGS. 7b and 7c are images showing microscope magnifications of (Co)MOF-74/TENAX thin films showing MOF nanocrystals.

DETAILED DESCRIPTION

Figure 1:
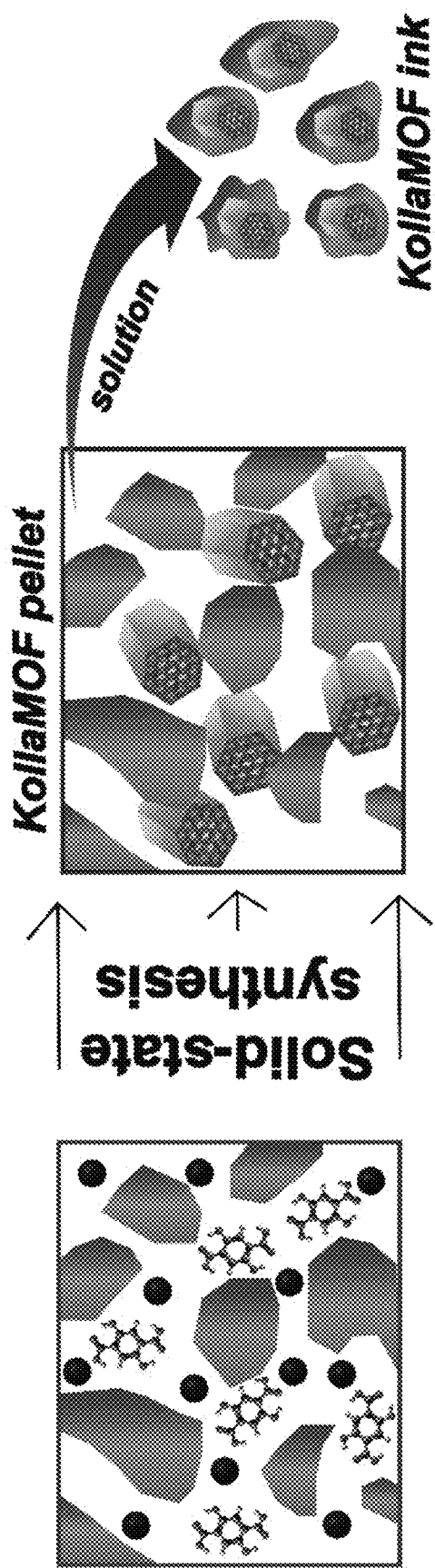
FIG. 1 is a schematic illustration of solid state synthesis of a hybrid composite material solid pellet in accordance with an embodiment of the invention and subsequent suspension thereof.

Described herein is a method for making a suspension comprising a metal organic framework (MOF) suspended in a polymer solution. The metal organic framework suspension may also be referred to in the present disclosure as a colloidal suspension, a colloidal ink, or an ink. As used herein, these terms are interchangeable. In an embodiment, the suspension comprises a nano-crystalline metal organic framework suspended in a polymeric solution, wherein the nano-crystalline metal organic framework comprises micropores having an average diameter in the range of 0.5-5.0 nm. In the suspension, the nano-crystalline metal organic framework is substantially homogenously dispersed in the polymeric solution, which comprises a first polymeric material dissolved in a non-aqueous solvent.

The metal organic framework suspended in the polymeric solution is formed using a solid state synthesis method, which method is described more fully below. The solid state synthesis method provides a relatively inexpensive, large-scale, environmentally-friendly and efficient way to improve integration between metal organic framework nanocrystals and mesoporous materials (e.g., mesoporous polymers). The solid state synthesis method provides mechanically stable, well-engineered, and multifunctional hybrid materials.

The solid state synthesis method produces a hybrid composite material comprising a nano-crystalline metal organic framework comprising micropores and a mesoporous polymeric material comprising mesopores. The nano-crystalline metal organic framework is homogeneously dispersed throughout the hybrid composite material and is substantially present only within the mesopores or void spaces of the mesoporous polymeric material. In a preferred embodiment, the hybrid material has a weight percentage of the metal organic framework in the range of 5-50% relative to the total weight of the hybrid composite material.

To form the suspension of the metal organic framework, the hybrid composite material is contacted with a solvent in which the mesoporous polymeric material is soluble. The polymeric material is dissolved in the solvent thus forming a polymeric solution in which the nano-crystalline metal organic framework is substantially homogeneously dispersed and suspended thereby forming the metal organic framework suspension. In a preferred embodiment, the non-aqueous liquid is an organic solvent in which the polymeric material is soluble but the metal organic framework is not. Thus, the polymeric material is dissolved to form a polymeric solution that serves as the continuous phase for the suspended MOE. Because the organic solvent should be capable of dissolving the polymeric material of the hybrid composite, the organic solvent varies depending on the polymeric material used to form the hybrid composite. Advantageously, commercially available organic solvents can typically be used to form the metal organic framework suspension. Exemplary organic solvents include, but are not limited to, tetrahydrofuran, methanol, chloroform, dichloromethane, ethanol, N,N-dimethylformamide, acetonitrile, acetone, isopropanol, propanol, butanol, methylene chloride ($CH_2Cl_2$), toluene, dioxane and the like. The organic solvent can have a concentration in the range of 10-300 mg/mL, preferably 25-275 mg/mL, more preferably 50-250 mg/mL, most preferably 100-200 mg/mL, or up to 300 mg/mL, preferably up to 200 mg/mL, more preferably up to 175 mg/mL, most preferably up to 150 mg/mL. In a preferred embodiment, the contacting is performed at a temperature of up to 80° C., preferably 10-80° C., preferably 15-60° C., preferably 20-40° C., preferably 22-30° C., or about room temperature and has a contacting time of up to 48 hours, preferably 0.5-36 hours, preferably 1-24 hours, preferably 2-12 hours, preferably 2.5-8 hours, preferably 3-6 hours.

In an embodiment, the metal organic framework suspension can be contacted with a second polymeric solution comprising a second polymeric material different from the mesoporous polymeric material to form a second metal organic framework suspension wherein two distinct polymeric materials are present. One of skill in the art will appreciate that additional polymeric materials may be added to the metal organic framework as suitable and appropriate for the end use application of the metal organic framework. Exemplary suitable polymeric materials include polyether block amide (e.g., PEBAX® sold by Arkema), PPEE, sulfonated poly (ether ether ketone) (SPEEK), 6-FDA and copolymers, polyvinylidene fluoride (PVDF), polymers of intrinsic microporosity (PIMs), polydimethylsiloxane (PDMS), polyvinyl acetate (PVAc), polyetherimide (for example, Ultem, manufactured by SABIC), poly(ferrocene-dimethylsilane)s (PFS), poly(phenylene oxide) (PPO), polycaprolactone (PCL), or polyvinyl butyral (PVB).

Alternatively, the metal organic framework suspension can be contacted with a second polymeric material (not in solution form) that is soluble in the solvent in which the mesoporous polymeric material was dissolved. The metal organic framework is substantially homogeneously dispersed and suspended in the continuous phase containing two (or more) dissolved polymeric materials in the same way that it is substantially homogeneously dispersed and suspended in the continuous phase containing one dissolved polymeric material.

As mentioned above, a 'solid state' synthesis method is used to produce the hybrid composite, and thus the metal organic framework. The solid state synthesis method allows for homogeneous growth of different MOF structures with a series of commercially available mesoporous materials (MPMs) regardless of their nature (silica, alumina, zeolite, carbon, polymer, etc.), pore architecture (size, pore distribution, etc.) or surface functionality (acidic, basic, etc.). Polymer mesoporous materials are primarily described herein, but it will be understood that other mesoporous materials may be used. The absence of solvent during crystallization restricts the crystal growth, size, and mobility to just the void space (inside the pores) of the mesoporous materials. The solid phase crystallization method can provide mechanically stable, well-defined, highly designed and multifunctional hybrid composite materials.

The solid state synthesis method provides high and homogeneous loading of MOF nanocrystals within MPMs achieved via a "multistep" impregnation of saturated aqueous solutions containing the MOF precursors: metal salt and ligand salt, instead of the acid form. An acidification step between the initial impregnation of the ligand salt solution and the metal salt solution within the MPM cavities is performed to prevent the formation of non-porous coordination polymers due to the fast polymerization rates upon addition of the metal salts in solution.

The solid state synthesis method may comprise i) contacting an aqueous solution of an organic ligand salt of the formula with a mesoporous material (MPM) to form an impregnated mesoporous salt material, ii) treating the impregnated mesoporous salt material with an aqueous acidic solution to form an impregnated mesoporous acid material, iii) contacting an aqueous solution of a metal precursor with the impregnated mesoporous acid material to form an impregnated mesoporous metal organic framework precursor, and iv) heating the impregnated mesoporous metal organic framework precursor in the absence of a solvent or exposing the impregnated mesoporous metal organic framework precursor to a volatile vapor in the absence of a solvent to form a hybrid material, wherein the hybrid material comprises a nano-crystalline metal organic framework (MOF) embedded within the mesoporous material.

In the first step, the aqueous solution of an organic ligand salt may be contacted with a mesoporous material (MPM) present at a concentration in the range of 10-300 mg/mL, preferably 25-275 mg/mL, more preferably 50-250 mg/mL to form an impregnated mesoporous salt material. Exemplary salts include, but are not limited to, mineral or organic acid salts of basic groups such as amines, and alkali or organic salts of acidic groups such as carboxylic acids. The salts may include, but are not limited to, the conventional non-toxic salts or the quaternary ammonium salts of the parent compound formed, for example, from non-toxic inorganic or organic acids. Salts of carboxylic acid containing ligands may include cations such as lithium, sodium, potassium, magnesium, additional alkali metals, and the like. The salts may also include, but are not limited to, the conventional non-toxic salts or the quaternary ammonium salts of the parent compound formed, for example, from non-toxic inorganic or organic acids. In a preferred embodiment, the salts are alkali metal salts, most preferably sodium salts. In a preferred embodiment, the contacting is performed at a temperature of up to 80° C., more preferably at about room temperature and has a contacting time of up to 48 hours. In some embodiments, the ligand (i.e., acid form; 2,6-dihydoxyterephthalic acid) may be dissolved and impregnated in water or organic solvents. Exemplary organic solvents include, but are not limited to, methanol, ethanol, tetrahydrofuran, N,N-dimethylformamide, acetonitrile, acetone, and the like.

In the second step, the impregnated mesoporous salt material present at a concentration in the range of 10-300 mg/mL, preferably 25-275 mg/mL, more preferably 50-250 mg/mL can be treated with an aqueous acidic solution of 0.05-10.0 M in concentration to form an impregnated mesoporous acid material. Strong acids including, but not limited to, HCl, $H_2SO_4$, and $HNO_3$ are preferred, but organic acids and weak acids (i.e. acetic acid) may also be used in the treating. In a preferred embodiment, the treating is performed at a temperature of up to 80° C. or about room temperature and has a treating time of up to 48 hours.

In the third step, the impregnated mesoporous acid material present at a concentration in the range of 10-300 mg/mL, preferably 25-275 mg/mL, more preferably 50-250 mg/mL can be contacted with an aqueous solution of a metal precursor to form an impregnated mesoporous metal organic framework precursor. In a preferred embodiment, the contacting is performed at a temperature of up to 80° C. or about room temperature and has a contacting time of up to 48 hours.

In the final step, the impregnated mesoporous metal organic framework precursor present at a concentration in the range of 10-300 mg/mL, preferably 25-275 mg/mL, more preferably 50-250 mg/mL is heated in the absence of a solvent or exposed to a volatile vapor (i.e. an amine such as methylamine or controlled moisture such as steam) in the absence of a solvent to form a hybrid composite material, or hereafter called MOF/MPM. In this step, the metal ions form coordinate bonds with the one or more organic ligands, preferably multidentate organic ligands to form a nano-crystalline metal organic framework in the pore spaces of the mesoporous material. In a preferred embodiment, the heating is performed at a temperature of up to 300° C., preferably 40-250° C., preferably 60-220° C., preferably 100-200° C., preferably 120-190° C., and has a heating time of up to 60 hours, preferably 12-48 hours, preferably 24-36 hours. In a preferred embodiment, the exposing to a vapor is performed at a temperature of up to 80° C., preferably 10-80° C., preferably 15-60° C., preferably 20-40° C., preferably 22-30° C., or about room temperature and has a heating time of up to 48 hours, preferably 6-36 hours, preferably 12-24 hours. In certain embodiments, a catalytic amount of a specific additive including (preferably 15%), but not limited to, methanol, ethanol, tetrahydrofuran, N,N-dimethylformamide, and the like may be employed to assist the crystal formation within the hybrid material.

In certain embodiments, the nano-crystalline metal organic framework is substantially present only within the mesopores or void spaces of the mesoporous material and substantially homogeneously dispersed within the mesopores or void spaces of the mesoporous material. As used herein, "disposed on", "embedded" or "impregnated" describes being completely or partially filled throughout, saturated, permeated and/or infused. The nano-crystalline MOF may be affixed substantially within the pore space of the mesoporous material. The nano-crystalline MOF may be affixed to the mesoporous material in any reasonable manner, such as physisorption or chemisorption and mixtures thereof. In one embodiment, greater than 10% of the pore spaces of the mesoporous material is embedded by the nano-crystalline MOF, preferably greater than 15%, preferably greater than 20%, preferably greater than 25%, preferably greater than 30%, preferably greater than 35%, preferably greater than 40%, preferably greater than 45%, preferably greater than 50%, preferably greater than 55%, preferably greater than 60%, preferably greater than 65%, preferably greater than 70%, preferably greater than 75%, preferably greater than 80%, preferably greater than 85%, preferably greater than 90%, preferably greater than 95%, preferably greater than 96%, preferably greater than 97%, preferably greater than 98%, preferably greater than 99%. In certain embodiments, the nano-crystalline metal organic framework is substantially present only within the mesopores or void spaces of the mesoporous material and homogeneously dispersed within the mesopores or void spaces of the mesoporous material, preferably greater than 60% of the nano-crystalline MOF is located in the pore spaces and not at the surface of the mesoporous material, preferably greater than 70%, preferably greater than 75%, preferably greater than 80%, preferably greater than 85%, preferably greater than 90%, preferably greater than 95%, preferably greater than 96%, preferably greater than 97%, preferably greater than 98%, preferably greater than 99%. As used herein, homogeneous dispersion refers to dispersion in a similar or the same manner and may refer to uniform structure and composition. In a preferred embodiment, the hybrid material is substantially free of MOF aggregates or an amorphous MOF phase and substantially comprises MOF particles as a nano-crystalline phase dispersed in a uniform manner throughout the pore spaces of the mesoporous material.

The solid state synthesis method may further comprise drying at least one selected from the group consisting of the impregnated mesoporous salt material, the impregnated mesoporous acid material, the impregnated mesoporous metal organic framework precursor, and the hybrid material at a temperature in the range of 25-160° C., preferably 85-150° C., preferably 90-140° C., preferably 100-130° C., or about 120° C. under a vacuum and with a drying time of up to 24 hours, preferably 0.5-18 hours, preferably 1-12 hours, preferably 1.5-6 hours, or about 2 hours.

The method may further comprise washing the hybrid material with distilled water or other polar protic solvent, and extracting water from the hybrid material in a Soxhlet system recycling methanol or other polar protic solvent.

Additionally, the method may further comprise a purification step. The purification step may remove undesirable impurities or insoluble species present in the hybrid composite material or remove metal organic frameworks that are outside the range of desirable size or shape. A purification step can aid in preparing hybrid composite materials substantially free of impurities and having substantially uniformly sized metal organic frameworks. Such hybrid composite materials are considered to be of high quality and are desirable in industrial applications. Additionally, high quality hybrid composite materials result in high quality suspensions, which are also desirable in industrial applications. For example, mixed matrix polymeric membranes for industrial applications require the use of high quality colloidal inks to avoid the formation of pin holes along the membrane during use.

In the purification step, the hybrid composite material may be dissolved in a solvent comprising one or more solvents, filtered and subsequently precipitated using a precipitant or combination of precipitants. The hybrid composite material may be dissolved in any solvent or combination of solvents in which it is soluble. Exemplary solvents include, but are not limited to, tetrahydrofuran, methanol, chloroform, dichloromethane, ethanol, N,N-dimethylformamide, acetonitrile, acetone, and the like. The solvent can have a concentration in the range of 10-300 mg/mL, preferably 25-275 mg/mL, more preferably 50-250 mg/mL, most preferably 100-200 mg/mL, or up to 300 mg/mL, preferably up to 200 mg/mL, more preferably up to 175 mg/mL, most preferably up to 150 mg/mL. The dissolution may be performed at a temperature of up to 80° C., preferably 10-80° C., preferably 15-60° C., preferably 20-40° C., preferably 22-30° C., or about room temperature and has a contacting time of up to 48 hours, preferably 0.5-36 hours, preferably 1-24 hours, preferably 2-12 hours, preferably 2.5-8 hours, preferably 3-6 hours.

The resulting solution can then be filtered. Common filtering techniques are suitable. For example, the solution can be filtered using commercially available filter paper. The filtered solution can be contacted with a precipitant in order to precipitate the purified hybrid composite material. For example, the filtered solution can be contacted with an organic liquid different from the solvent in which the hybrid composite material was dissolved in order to precipitate the hybrid composite material. As one of skill in the art will appreciate, the precipitant will vary based on the composition of the hybrid composite material. The hybrid composite material may be precipitated using suitable liquids or combinations of liquids that achieve precipitation. Exemplary precipitants include, but are not limited to, tetrahydrofuran, methanol, chloroform, dichloromethane, ethanol, N,N-dimethylformamide, acetonitrile, acetone, and the like. The precipitant can have a concentration in the range of 10-300 mg/mL, preferably 25-275 mg/mL, more preferably 50-250 mg/mL, most preferably 100-200 mg/mL, or up to 300 mg/mL, preferably up to 200 mg/mL, more preferably up to 175 mg/mL, most preferably up to 150 mg/mL. The precipitation may be performed at a temperature of up to 80° C., preferably 10-80° C., preferably 15-60° C., preferably 20-40° C., preferably 22-30° C., or about room temperature and has a contacting time of up to 48 hours, preferably 0.5-36 hours, preferably 1-24 hours, preferably 2-12 hours, preferably 2.5-8 hours, preferably 3-6 hours. The resulting solid hybrid composite material can be filtered using any suitable filtration technique. For example, the solid hybrid composite material may be filtered using a filtration funnel.

The mesoporous material used in the hybrid composite material can be at least one selected from the group consisting of a mesoporous metal oxide (aluminum oxide, cerium oxide, titanium oxide, zirconium oxide, magnesium oxide, etc.), a mesoporous silica, a mesoporous carbon, a mesoporous polymer, a mesoporous silicoalumina (zeolite), a mesoporous organosilica, and a mesoporous aluminophosphate, etc. In a more preferred embodiment, the mesoporous material is a mesoporous polymer. Exemplary suitable mesoporous polymers include Tenax®, mesoporous polyacrylamides, and mesoporous polyacrylonitriles. Additional exemplary mesoporous polymers include the polymers described in the publication Design and Preparation of Porous Polymers, Wu, et al., *Chem. Rev.*, 2012, 112 (7), pp 3959-4015, incorporated by reference herein.

Notwithstanding any of the foregoing, the mesoporous polymeric material may be any suitable polymeric material having mesopores and/or macropores as described herein and capable of absorbing a solution. As used herein, a mesoporous material may refer to a material containing pores with diameters between 2-50 nm. In a preferred embodiment, the mesoporous material has a percent porosity of greater than 10%, preferably greater than 20%, preferably greater than 25%, preferably greater than 30%, preferably greater than 35%, preferably greater than 40%. The mesoporous material may also contain larger pores (i.e., macropores) with diameters between 50-500 nm.

The organic ligand of the organic ligand salt can be at least one selected from the group consisting of polycarboxylate ligands, azaheterocyclic ligands, and derivatives thereof. As used herein, "ligand" refers to a mono-dentate or polydentate compound that bind a transition metal or a plurality of transition metals, respectively. Generally a linking moiety comprises a substructure covalently linked to an alkyl or cycloalkyl group, comprising 1 to 20 carbon atoms, an aryl group comprising 1 to 5 phenyl rings, or an alkyl or aryl amine comprising alkyl or cycloalkyl groups having from 1 to 20 carbon atoms or aryl groups comprising 1 to 5 phenyl rings, and in which a linking cluster (e.g., a multi-dentate function groups) are covalently bound to the substructure. A cycloalkyl or aryl substructure may comprise 1 to 5 rings that comprise either of all carbon or a mixture of carbon with nitrogen, oxygen, sulfur, boron, phosphorus, silicon and/or aluminum atoms making up the ring. Typically the linking moiety will comprise a substructure having one or more carboxylic acid linking clusters covalently attached.

The organic ligand of the organic ligand salt can be at least one selected from the group consisting of terephthalate, benzene-1,3,5-tricarboxylate, 2,5-dioxybenzene dicarboxylate, biphenyl-4,4'-dicarboxylate and derivatives thereof. In another preferred embodiment, the organic ligand of the organic ligand salt is at least one selected from the group consisting of imidazolate, pyrimidine-azolate, triazolate, tetrazolate and derivatives thereof. Additional suitable exemplary ligands include, but are not limited to, bidentate carboxylics (i.e. oxalic acid, malonic acid, succinic acid, glutaric acid, phthalic acid, isophthalic acid, terephthalic acid), tridentate carboxylates (i.e. citric acid, trimesic acid), azoles (i.e. 1,2,3-triazole, pyrrodiazole), squaric acid and mixtures thereof.

The metal of the metal precursor can be at least one transition metal selected from the group consisting of Mg, V, Cr, Mo, Zr, Hf, Mn, Fe, Co, Cu, Ni, Zn, Ru, Al, and Ga. As used herein, "metal ion" is selected from the group consisting of elements of groups Ia, IIa, IIIa, IVa to VIIIa and IB to VIb of the periodic table of the elements. In certain other embodiments, the metal precursor may comprise clusters of metal oxides. The metal of the metal precursor can be selectively chosen based on the end use application in which the resulting metal organic framework will be used.

In a preferred embodiment, the metal organic framework is at least one selected from the group consisting of MIL-101, MIL-100, MIL-53, MOF-74, UiO-66, UiO-67, ZIF-8, ZIFs, HKUST-1, $M_2$(dobpdc), NU-1000, PCN-222, PCN-224, and derivatives thereof. As used herein, a metal organic framework may refer to compounds consisting of metal ions or clusters coordinated to organic ligands to form one-, two- or three-dimensional structures, with the special feature of porosity. More formally, a metal organic framework is a coordination network with organic ligands containing potential voids. In a preferred embodiment, the nano-crystalline MOF has a percent porosity of greater than 10%, preferably greater than 20%, preferably greater than 25%, preferably greater than 30%, preferably greater than 35%, preferably greater than 40%.

MOFs are composed of two major components: a metal ion or cluster of metal ions and an organic molecule often termed a linker. The organic units are typically mono-, di-, tri-, or tetravalent ligands. The choice of metal and linker will dictate the structure and properties of the MOF. For example, the metal's coordination preference influences the size and shape of pores by dictating how many ligands can bind to the metal and in which orientation.

In a preferred embodiment, the hybrid material has a weight percentage of the metal organic framework in the range of 5-50% relative to the total weight of the hybrid material, preferably 15-45%, preferably 25-40%, preferably 30-35%, or at least 20%, preferably at least 25%, preferably at least 30%, preferably at least 35%, preferably at least 40%, preferably at least 45%.

In a preferred embodiment, the hybrid material comprises mesopores with an average diameter in the range of 2-50 nm, preferably 4-45 nm, preferably 6-40 nm and micropores with an average diameter in the range of 0.5-5.0 nm, preferably 1.0-4.5 nm, preferably 2.0-4.0 nm. In a preferred embodiment, the mesopores, the micropores, or both are monodisperse having a coefficient of variation of less than 10%, preferably less than 8%, preferably less than 6%, preferably less than 5%, preferably less than 4%, preferably less than 3%. In a preferred embodiment, the hybrid material has a percent porosity of greater than 10%, preferably greater than 20%, preferably greater than 25%, preferably greater than 30%, preferably greater than 35%, preferably greater than 40%. In a preferred embodiment, the hybrid material has a reduced mesoporosity relative to the bare mesoporous material and an increased microporosity relative to the bare mesoporous material.

In a preferred embodiment, the nano-crystalline metal organic framework has an average longest linear dimension of less than 200 nm, preferably less than 100 nm, preferably less than 70 nm, preferably less than 40 nm. The nano-crystalline metal organic framework may have an average diameter in the range of 5-100 nm, more preferably in the range of 5-50 nm.

In a preferred embodiment, the hybrid material has a surface area in the range of 10-1200 $m^2/g$ or at least 400 $m^2/g$. In a preferred embodiment, the hybrid material has a surface area in the range of 105-500% that of the surface area of the impregnated mesoporous salt material, preferably 150-450%, preferably 175-400%, preferably 200-350%, preferably 225-350% that of the surface area of the impregnated mesoporous salt material. In a preferred embodiment, the hybrid material has a surface area in the range of 125-500% that of the surface area of the bare mesoporous material, preferably 150-450%, preferably 175-400%, preferably 200-350%, preferably 225-350% that of the surface area of the bare mesoporous material. In a preferred embodiment, the hybrid material has an average longest linear dimension of 100-500 μm.

The hybrid material may comprise a mesoporous material comprising mesopores and a nano-crystalline metal organic framework comprising micropores, wherein the nano-crystalline metal organic framework is homogeneously dispersed and substantially present within the mesopores or void spaces of the mesoporous material, and wherein the hybrid material has a weight percentage of the metal organic framework in the range of 5-50% relative to the total weight of the hybrid material.

The hybrid material may be used in preparing a gas adsorbent. The gas adsorbent comprising the hybrid material may be used in a method of adsorbing, separating, storing or sequestering at least one gas, comprising contacting the gas adsorbent with the at least one gas, wherein the at least one gas is selected from the group consisting of hydrogen ($H_2$), hydrogen sulfide ($H_2S$), sulfur dioxide ($SO_2$), methane ($CH_4$), oxygen ($O_2$), Xenon (Xe), Krypton (Kr) and carbon dioxide ($CO_2$). The gas adsorbent may be in the form of a mixed matrix membrane, for example a polymeric mixed matrix membrane. A suspension of the metal organic framework is particularly suitable for use as a polymeric additive to commercially available polymer membranes to improve performance of the commercially available membrane. For example, as will be shown below in the Examples, a suspension of the metal organic frameworks described herein can be added to a mixed matrix membrane to improve permeability and selectivity of mixed matrix membrane.

In an embodiment, the gas adsorbent may be polymeric membrane comprising a nano-crystalline metal organic framework and a polymeric matrix comprising a first polymeric material and a second polymeric material, wherein the nano-crystalline metal organic framework is substantially homogenously dispersed throughout the matrix. The metal organic framework comprises micropores having an average diameter in the range of 0.5-5.0 nm. The polymeric membrane may comprise up to 30 wt % nano-crystalline metal organic framework, or a concentration range of 1 to 30 wt % nano-crystalline metal organic framework, preferably a range of 3-8 wt % nano-crystalline metal organic framework.

The polymeric membrane has variable thickness. Suitable thickness will be determined based on end use applications. Some applications require relatively thin thickness dimensions (e.g., 10-200 microns) that have been difficult to achieve with conventionally-produced metal organic frameworks. However, the presently described method is able to achieve very small dimensions (e.g., 5 nm-25 nm) for the metal organic framework thus advantageously enabling production of very thin polymeric membranes containing the metal organic frameworks. The polymeric membrane in accordance with an embodiment of the invention may have a thickness from 10-200 microns, more preferably a thickness from 10-60 microns, or may have a maximum thickness of 100 microns.

The hybrid material may be used in a method for liquid/gas chromatography. Exemplary types of chromatographic method include, but are not limited to, high-performance liquid chromatography (HPLC), chiral chromatography, gas chromatography, and the like. The hybrid material may be used in an application for sensing, capture and catalytic degradation of harmful gases and vapors.

EXAMPLES

Example 1

The following is an example showing the solid state synthesis method, including purification and suspension of the resulting hybrid composite material.

A hybrid composite material comprising (Co)MOF-74 as the metal organic framework and TENAX® as the mesoporous polymeric material was prepared by impregnation of an equivolumetric solution of tetrahydrofuran (THF) and methanol (MeOH) containing the Co precursor ($Co(NO_3)_2$) and the organic ligand (2,5-dihydroxyterephthalic acid) on mesoporous polymer TENAX® (80-100 mesh and 0.5 µm solid pellets) previously evacuated overnight at 120° C. TENAX is commercially available from BUCHEM BV. Solvent mixtures of THF-MeOH were used for the impregnation because TENAX® polymer is highly soluble in certain organic solvents, such as chloroform ($CHCl_3$) or THF, but completely insoluble in MeOH. The resulting impregnated solid was evacuated at 40° C. in a rotavapor and loaded into a tubular reactor where the fluidized hybrid composite material precursor was exposed to a $N_2$ stream containing triethylamine vapor to promote fast MOF crystallization (e.g., few minutes). The resulting wine-colored solid was washed overnight in a Soxhlet extractor with MeOH.

The resulting hybrid composite material pellets were purified by dissolution in chloroform, filtration, and subsequent precipitation by adding MeOH in order to remove minor insoluble species coming from the TENAX® pellet and a small fraction of concomitant larger MOF particles formed on the outer surface of TENAX® during solid state synthesis. FIGS. 1 to 6 provide characterization information for the resulting (Co)MOF-74/TENAX solid pellets.

Figure 2A:
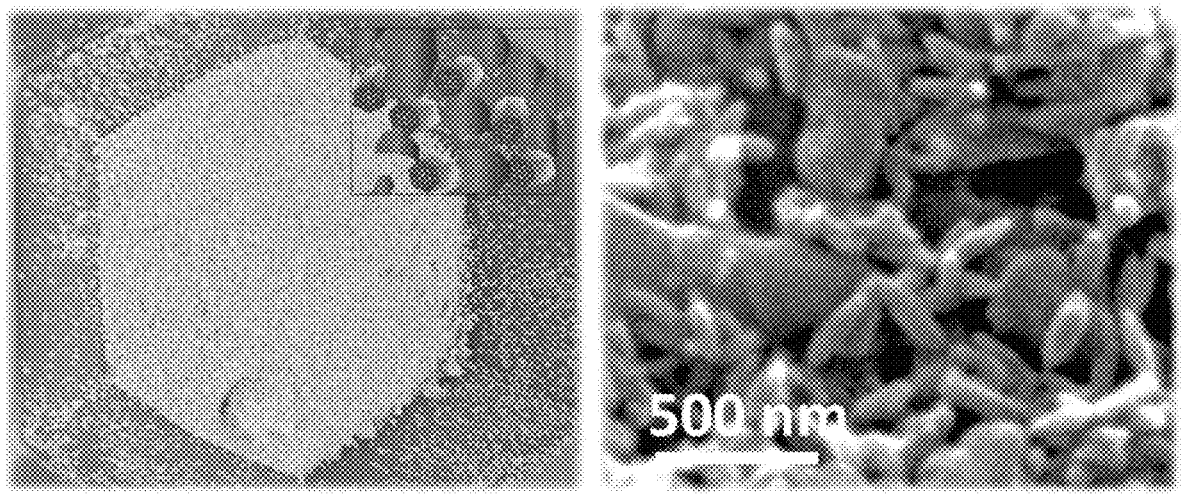
FIGS. 2a, 2b, and 2c are pictures and electronic microscope images of the hybrid composite material in various forms.
Figure 2B:
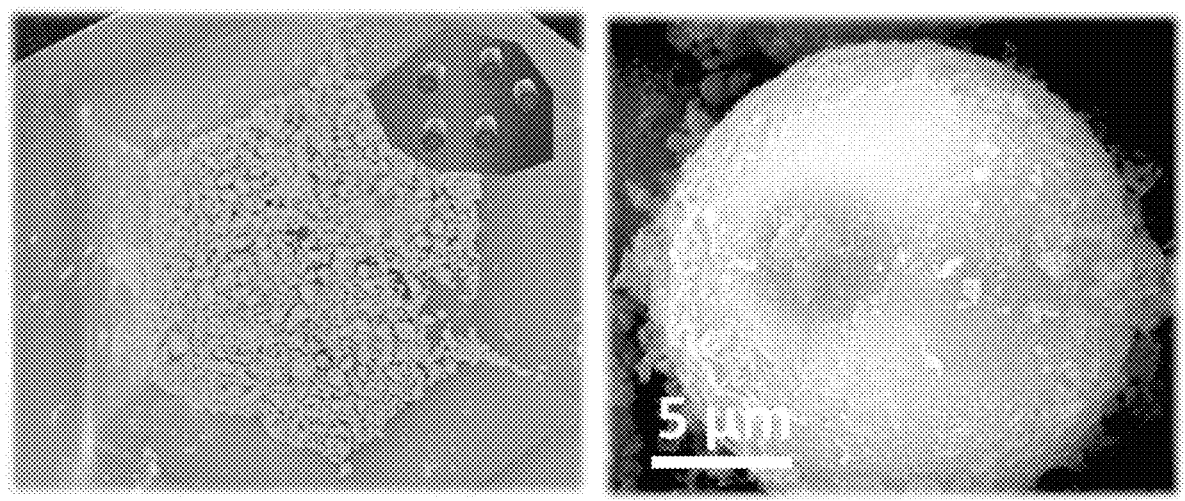
Figure 2C:
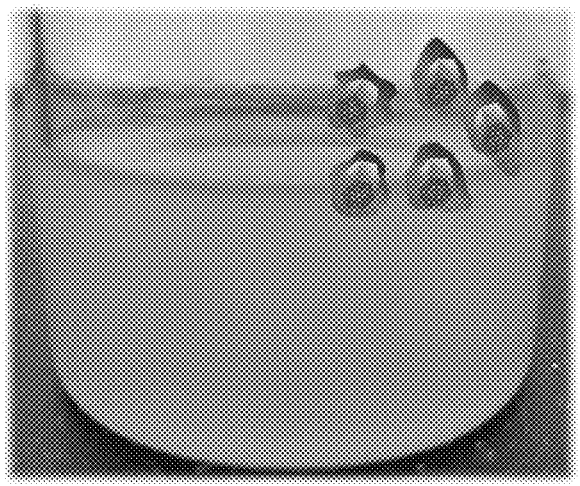
Figure 2C:
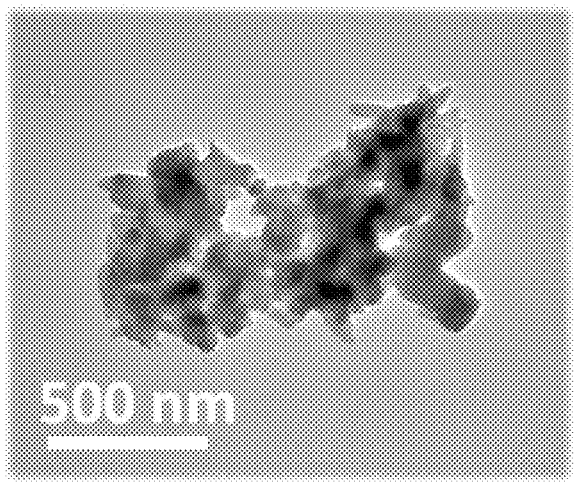

FIG. 1 is a schematic illustration of solid state synthesis of the hybrid composite material solid pellet and subsequent suspension thereof. FIGS. 2a, 2b, and 2c are pictures and electronic microscope images of the hybrid composite material in various forms: 2a) as-synthetized solid pellets (SEM), 2b) purified solid pellets (SEM), and 2c) suspended liquid (Co)MOF-74 (TEM).

As shown in FIG. 2a, the as-synthetized solid pellets, before purification, are typical rod-like (Co)MOF-74 nanocrystals (65×200 nm in average size) dispersed within the porous surface of the non-regular mesoporous TENAX® pellet. Upon purification, the solid hybrid composite material comprises mono-dispersed TENAX® spheres embedding MOF nanocrystals (FIG. 2b). The spherical particle size can be modulated by controlling the MeOH:$CHCl_3$ ratio utilized for the purification step.

Purified hybrid composite material pellets were converted into colloidal inks by dissolution in $CHCl_3$ (up to 150 mg/mL). Transmission electron microscopy (TEM) analysis of the colloidal ink deposited over a Cu grid allows the visualization of the rod-like MOF nanocrystals, as seen for as-synthetized hybrid composite material pellet, as well as, smaller MOF nanocrystals previously confined within smaller cavities present in the interior of the mesoporous TENAX® pellet (FIG. 2a). Energy-dispersive X-ray spectroscopy (EDS) analysis of the hybrid composite material confirmed the presence of Co monodispersed along the pellets.

FIG. 3 provides characterization information for the exemplary hybrid composite material. The figures are as follows: 3(b) XRD, 3(c) FTIR analysis and 3(a) $N_2$ adsorption isotherms (inset figure: pore diameter (nm) at X-axis and pore volume ($cm^3$/g·nm)) of the pellet before and after purification compared to bulk (Co)MOF-74 and bare TENAX®. FIG. 3(d) are $CO_2$ and $N_2$ adsorption isotherms for purified pellets at 23° C. compared to bulk (Co)MOF-74.

As shown in FIG. 3, XRD and FTIR analysis of (Co)MOF-74/TENAX® confirm the presence of the MOF within the TENAX matrix before and after purification. The diffraction peaks corresponding to the mesoporous TENAX® pellets disappear upon purification, thus showing more clearly the diffraction peaks attributed to the MOF-74 crystalline phase due to the loss of TENAX® pristine crystallinity (FIG. 3b). FTIR analysis shows overlapped signals attributed to either TENAX® or MOF. $N_2$ adsorption isotherms reveals the hybrid nature of the as-synthetized hybrid pellets, as reveals the coexistence of both microporosity attributed to MOF and mesoporosity corresponding to the TENAX® pellet. The porous structure of TENAX® is completely lost upon purification while the microporosity of the MOF nanocrystals remains intact.

Figure 3A:
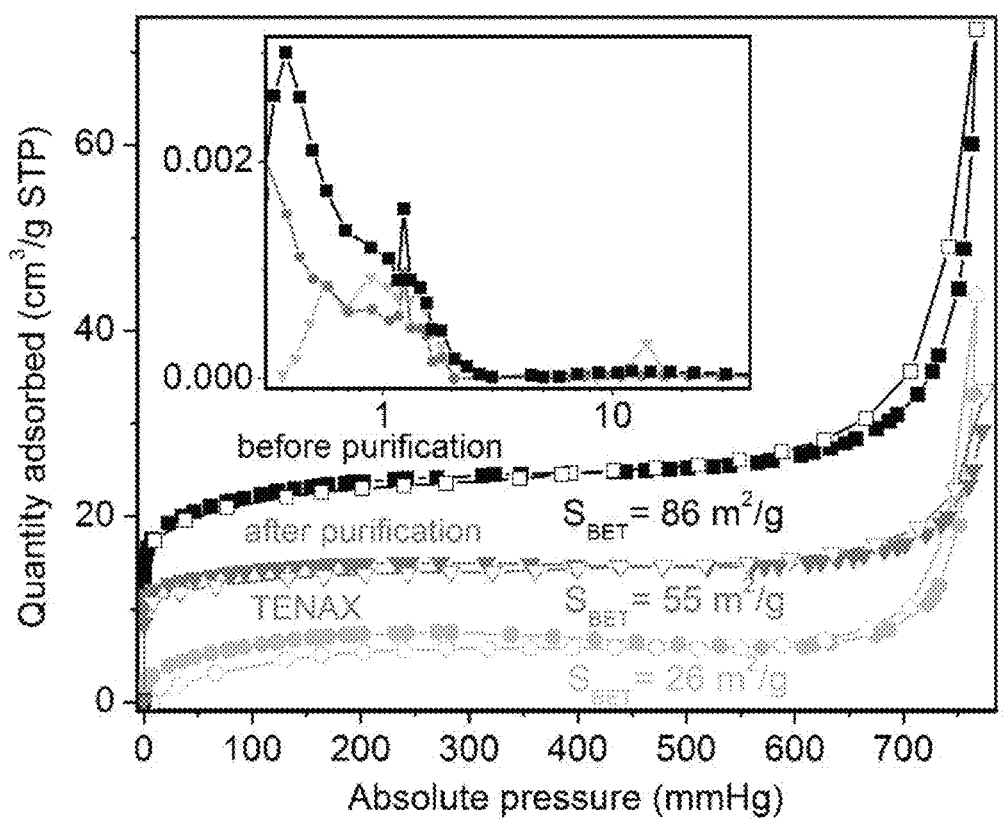
FIG. 3a is $N_2$ isotherms (inset figure: pore diameter (nm) at X-axis and pore volume ($cm^3$/g nm)) of the solid pellet of Example 1 before and after purification compared to bulk (Co)MOF-74 and bare TENAX®.
Figure 3B:
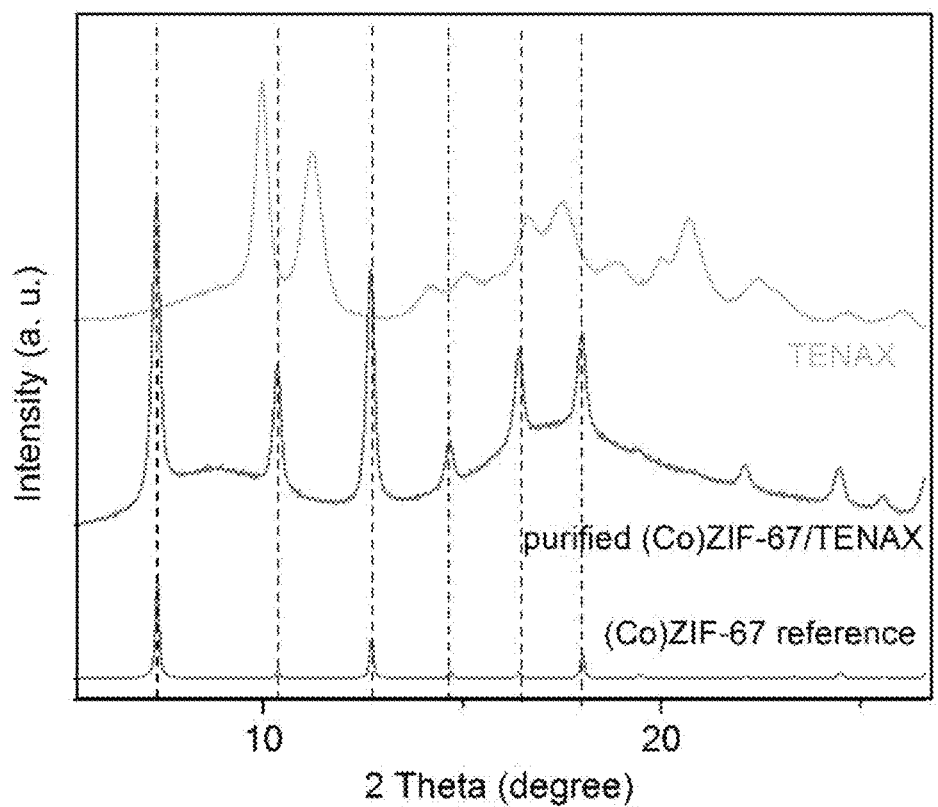
FIG. 3b is an X-ray diffraction result (XRD) of the solid pellet of Example 1 before and after purification compared to bulk (Co)MOF-74 and bare TENAX.
Figure 3C:
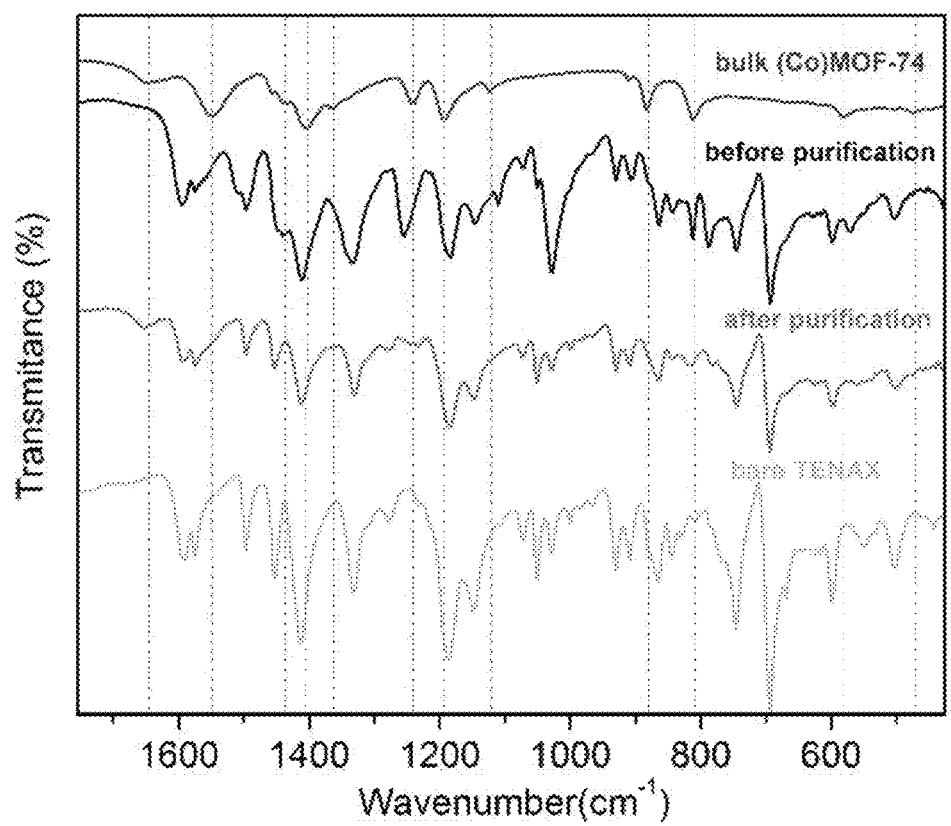
FIG. 3c is Fourier-transform infrared spectroscopy (FTIR) analysis of the solid pellet of Example 1 before and after purification compared to bulk (Co)MOF-74 and bare TENAX.
Figure 3D:
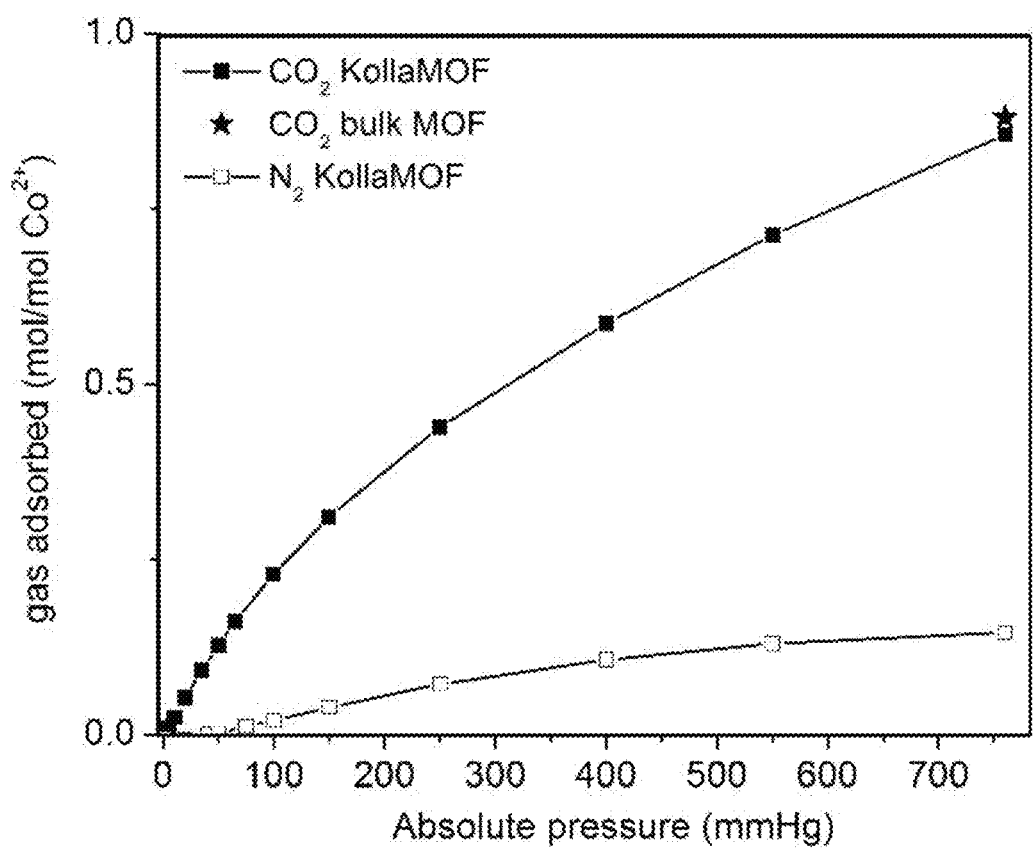
FIG. 3d is $CO_2$ and $N_2$ isotherms for purified solid pellets at 23° C. compared to bulk (Co)MOF-74 for Example 1.

Certain reduction on the surface area is attributed to the removal of concomitant larger MOF particles by purification, as mentioned above. A partial blockage of the MOF monodimensional channels is suggested by the apparent loss of notable micropore volume. Nevertheless, $CO_2$ isotherm analysis performed at 23° C. confirms the accessibility of the Co open metal sites, which resulted to be the same as measured for bulk (Co)MOF-74 (0.8 mol $CO_2$/mol of Co), according to the 14 wt % of Co contain determined by X-ray fluorescence (XRF). This assures an intimate contact between polymer and MOF, which can enhance the selective adsorption of $CO_2$ versus $N_2$ upon integration of a suspension of the hybrid composite material into a mixed matrix membrane for $CO_2$ separation (FIG. 3d).

Advantageously hybrid composite material solid pellets show excellent processability due to the precise control over the particle size and MOF loading, which enables use of the MOF in conventional polymer industrial uses without requiring additional treatments. Hybrid composite material solid pellets can be dissolved, extruded or melted depending on the intrinsic physicochemical properties of the mesoporous polymer used. Therefore, they can be directly integrated as typically done for conventional polymeric additives. In the same way, hybrid composite material inks can be easily prepared by simple dissolution of hybrid material pellets into organic solvents, and therefore, be fully integrated into technologies implying polymeric inks, such as membranes, coatings, 3D printing inks, films or textiles. Moreover, large scale (e.g., 4 kg) solid state synthesis of fluidized MOF/mesoporous materials has been recently demonstrated by our group, which assures the viability towards industrial scale manufacture of fluidized hybrid material solid pellets.

Example 2

The following is an example of using a hybrid composite material ink in a mixed matrix membranes for gas separation.

As shown in this example, hybrid composite material inks can be used as an additive for mixed matrix membranes. In this example, their use lead to high $CO_2/N_2$ separation selectivity (up to 170) at very low MOF concentrations (ranging from 1 to 7 wt. %) while exhibiting a two-phase snakeskin microstructure.

Figure 4:
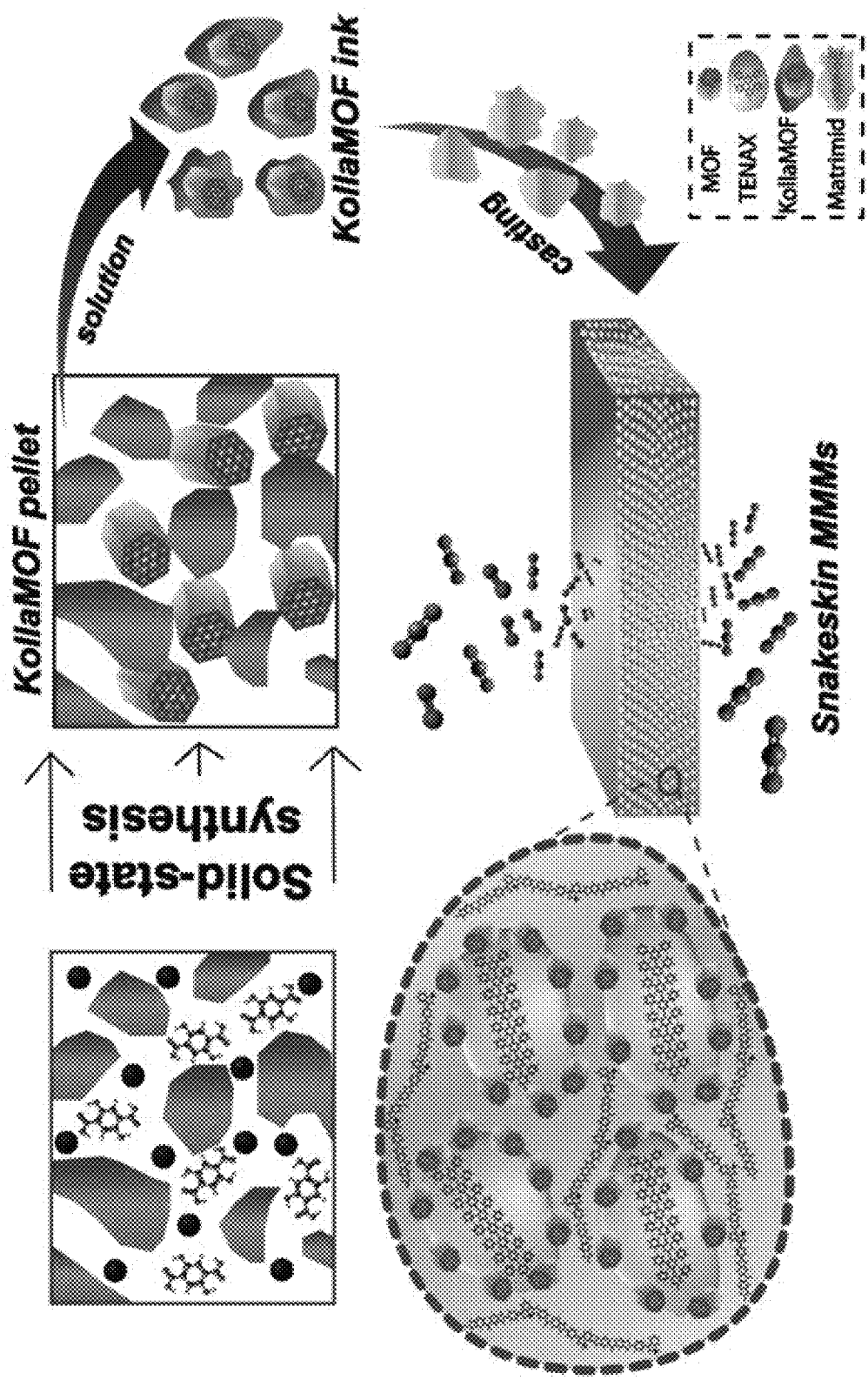
FIG. 4 is a schematic representation of the hybrid composite material suspension and MATRIMID® solution casting into snakeskin-like mixed matrix membrane as described in Example 2.
Figure 5:
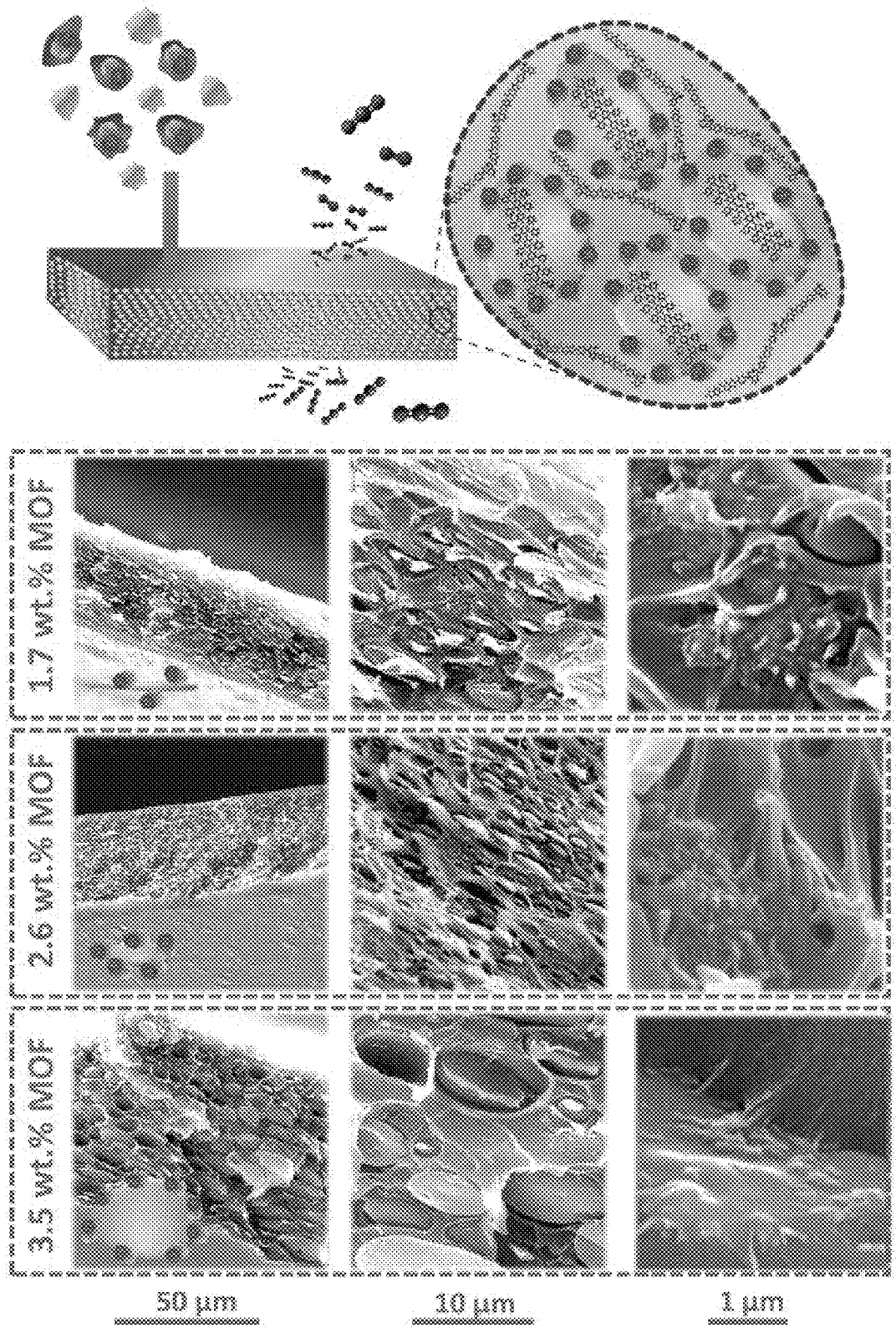
FIG. 5 is a schematic representation of the hybrid composite material suspension and MATRIMID® solution casting into snakeskin-like mixed matrix membrane scanning electron microscope (SEM) analysis showing the effect of the MOF loading on the mixed matrix membrane microstructure for Example 2.
Figure 6:
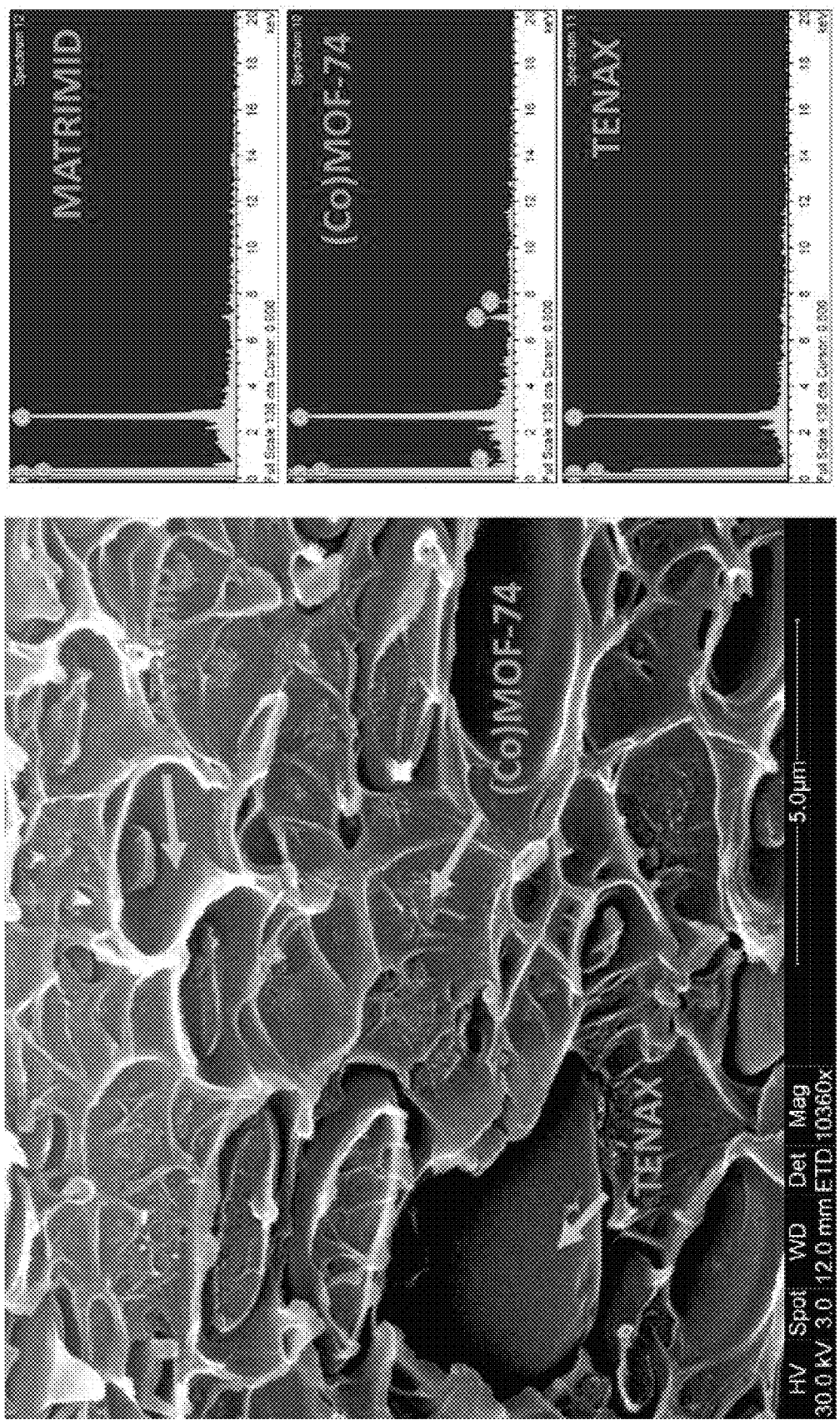
FIG. 6 is a Scanning Electron Microscopy/Energy-Dispersive X-ray Spectroscopy (SEM/EDS) analysis of the snakeskin-like mixed matrix membrane in FIG. 5.

FIG. 4 provides a schematic representation of the hybrid composite material ink and Matrimid solution casting into snakeskin-like mixed matrix membrane. FIG. 5 provides SEM analysis showing the effect of the MOF loading on the mixed matrix membrane microstructure. The microstructure can be tailored into one-phase nanostructure by selection of the concentrations of the three components: MOF, mesoporous polymer and polymeric matrix. FIG. 6 provides a SEM/EDS analysis of the three different components forming the mixed matrix membrane microstructure: MOF, TENAX® and MATRIMID®.

The use of the hybrid composite material ink as an active additive in mixed matrix membranes addresses, in a single step, three of the well-established requisites for a mixed matrix membranes: nanometric size of the MOF particles, good dispersion of the MOF particles and good MOF-polymer interface compatibility. Use of the hybrid composite material ink also provides additional control and understanding over the mixed matrix material microstructure, in contrast to other reported methods using bulk or free-standing MOFs, which require the use of additives, post-synthesis modification steps, in situ modulation, large amounts of toxic solvents or tedious purification steps. The integration of the hybrid composite material ink into conventional polymeric matrices leads to mixed matrix membranes having a snakeskin-like microstructure that have demonstrated an excellent boost on the performance for $CO_2$ separation from flue gas.

Here, exemplary hybrid composite materials were combined with MATRIMID® 5218 polymer in varying concentrations. MATRIMID® 5218 is a soluble thermoplastic polyimide. For the results shown in Table 1, a hybrid composite material using (Co)MOF-74 as the MOF was used with Tenax® as the mesoporous polymer. In Table 1, the exemplary mixed matrix membranes are shown using the following code: xKyM, x=hybrid composite material loading (wt. %) in the membrane, y=MOF loading (wt. %) in the membrane. Permeability is given in barrer$^a$ (g cm s$^{-1}$ cm$^{-2}$ bar). The exemplary mixed matrix membranes were prepared as follows: An ink containing 12-14 wt. % of the corresponding solid mixture of the two components (purified hybrid composite material ((Co)MOF-74/Tenax®) and Matrimid at the specified ratios, see Table 1) in $CHCl_3$ was stirred to allow the complete dispersion of the solid components. The colloidal nature of the hybrid composite material additive formed well-dispersed inks in a few minutes. The inks formed with MOF additives showed no bubbles upon sonication compared to MOF-free polymeric inks. It is understood that bubbles usually lead to pinhole formation in the resulting membrane upon casting. The viscous ink was poured on a flat surface and shaped as a thin film membrane by a doctor blade knife. The solvent was removed from the membrane by evaporation, first by natural convection at room temperature for 30 min, followed by a treatment under vacuum at 120° C. for 1 hour.

TABLE 1

Gas separation performance of hybrid composite ((Co)MOF-74/Tenax ®) material-based mixed matrix membranes at 21° C.

| MMM | Pressure (psig) | $CO_2/N_2$ feed | Permeability (barrer $^a$) $N_2$ | Permeability (barrer $^a$) $CO_2$ | Permselectivity $CO_2/N_2$ |
|---|---|---|---|---|---|
| 10K1.4M | " | " | 0.71 | 35.2 | 49.6 |
| 25K1.7M | " | " | 0.29 | 32.2 | 111 |
| 25K2.6M | " | " | 0.29 | 35.9 | 124.1 |
| " | 75 | " | 0.32 | 32.4 | 101.3 |
| " | 100 | " | 0.33 | 33.8 | 102.4 |
| 25K3.7M | 50 | " | 0.30 | 31.3 | 104 |
| 50K5M | 50 | | 0.24 | 32.0 | 133.3 |
| 50K7M | 50 | | 0.32 | 42 | 131.3 |
| " | 100 | | 0.44 | 42.7 | 97.0 |

For the results shown in Table 2, hybrid composite materials using different MOF nanocrystals were compared with a mixed matrix material (MMM) in which no MOF was used. The following MOFs were tested: (Co)MOF-74, (Co)ZIF-67, (Zr)UiO-66($NH_2$), and (Zn)ZIF-8. For the MMM containing MOFs, the MMMs included 25 wt % hybrid composite material inks and 75 wt % MATRIMID® 5218. In Table 2, the metal contain in hybrid composite material ink was determined by XRF, MOF contain in the hybrid composite material ink was calculated from MOF molecular formula, and the MOF loading heading indicates the MOF loading in the MMM.

TABLE 2

Permeaselectivity of MMM with hybrid composite materials using different MOF nanocrystals.

| MMM | MOF | Metal contain (wt. %)$^a$ | MOF contain (wt. %)$^b$ | MOF loading (wt. %)$^c$ | Permeability (Barrer) | Selectivity |
|---|---|---|---|---|---|---|
| — | — | — | — | — | 16 | 15 |
| 1 | (Co)MOF-74 | 2.8 | 8.5 | 2.1 | 38 | 102 |
| 2 | (Co)ZIF-67 | 2.9 | 8.5 | 2.1 | 49 | 29 |
| 3 | (Zr)UiO—66(NH$_2$) | 2.6 | 8.4 | 2.1 | 44 | 48 |
| 4 | (Zn)ZIF-8 | 3.2 | 9.5 | 2.4 | 33 | 76 |

Example 3

The following is an example of using a hybrid composite material ink in a thin film for food packaging.

In this example, 10 wt. % of (Co)MOF-74/Tenax® was incorporated into Polyvinyl butyral (PVB) and Polycaprolactone (PCL) thin films. The thin films were successfully used in a food packaging application. FIGS. 7a, 7b, and 7c illustrate the food packaging application. FIG. 7a is a photograph showing a comparison between thin films comprising (Co)MOF-74/Tenax® and thin films not comprising the exemplary hybrid composite material ink. As can be seen, the thin films comprising the exemplary hybrid composite material ink performed just as well as those not containing the exemplary hybrid composite material ink. FIGS. 7b and 7c are microscope magnifications of (Co)MOF-74/TENAX thin films showing MOF nanocrystals.

Numerous modifications and variations of the present disclosure are possible in view of the above teachings. It is understood that within the scope of the appended claims, the disclosure may be practiced otherwise than as specifically described herein.

It should be understood that the above description is only representative of illustrative embodiments and examples. For the convenience of the reader, the above description has focused on a limited number of representative examples of all possible embodiments, examples that teach the principles of the disclosure. The description has not attempted to exhaustively enumerate all possible variations or even combinations of those variations described. That alternate embodiments may not have been presented for a specific portion of the disclosure, or that further undescribed alternate embodiments may be available for a portion, is not to be considered a disclaimer of those alternate embodiments. One of ordinary skill will appreciate that many of those undescribed embodiments, involve differences in technology and materials rather than differences in the application of the principles of the disclosure. Accordingly, the disclosure is not intended to be limited to less than the scope set forth in the following claims and equivalents.

The invention claimed is:

1. A polymeric membrane, comprising:
a nano-crystalline metal organic framework comprising micropores, wherein the micropores have an average diameter in the range of 0.5-5 nm, and
a polymeric matrix comprising a first polymeric material and a second polymeric material, wherein the nano-crystalline metal organic framework is substantially homogenously dispersed throughout the matrix, wherein the metal organic framework is at least one selected from the group consisting of MIL-101, MIL-100, MIL-53, MOF-74, UiO-66, UiO-67, ZIF-8, ZIFs, HKUST-1, M$_2$(dobpdc), NU-1000, PCN-222, PCN-224, and derivatives thereof.

2. The polymeric membrane of claim 1, wherein the membrane comprises up to 30 wt % nano-crystalline metal organic framework.

3. The polymeric membrane of claim 1, wherein the membrane comprises up to 20 wt % nano-crystalline metal organic framework.

4. The polymeric membrane of claim 1, wherein the membrane comprises up to 10 wt % nano-crystalline metal organic framework.

5. The polymeric membrane of claim 1, wherein the membrane comprises 1 to 30 wt % nano-crystalline metal organic framework.

6. The polymeric membrane of claim 1, wherein the membrane comprises 3-8 wt % nano-crystalline metal organic framework.

7. The polymeric membrane of claim 1, wherein a thickness of the polymeric membrane is from 10-200 microns.

8. The polymeric membrane of claim 1, wherein a thickness of the polymeric membrane is a maximum of 100 microns.

* * * * *